United States Patent [19]

Newbery

[11] Patent Number: 4,702,497

[45] Date of Patent: Oct. 27, 1987

[54] METHOD OF ENCODING A SYMBOL OR MESSAGE ON A PLASTIC MATERIAL AND AN ARTICLE ON WHICH A SYMBOL HAS BEEN SO ENCODED

[76] Inventor: Tomas H. Newbery, Ridge Rd., Glen Cove, N.Y. 11542

[21] Appl. No.: 858,687

[22] Filed: May 2, 1986

[51] Int. Cl.$^4$ .................. G09C 5/00; B42D 15/00; B29C 59/02; B29C 61/00

[52] U.S. Cl. .................................. 380/59; 264/2.7; 264/162; 264/230; 264/234; 264/293; 264/345; 283/901; 283/904; 428/916; 434/328; 434/346; 283/72

[58] Field of Search ............... 264/2.7, 293, 162, 230, 264/234, 345; 283/72, 901, 904; 428/916; 434/328, 346, 119

[56] References Cited

U.S. PATENT DOCUMENTS

| | | |
|---|---|---|
| 730,823 | 6/1903 | Hall . |
| 2,516,727 | 7/1950 | Schultheiss . |
| 2,529,151 | 11/1950 | Glass et al. . |
| 2,580,305 | 12/1951 | Kremer . |
| 3,508,344 | 4/1970 | Thomas ................................. 283/72 |
| 3,758,649 | 9/1973 | Frattarola ........................... 264/1.3 |
| 4,076,772 | 2/1978 | Murbach et al. .................... 264/1.3 |
| 4,409,277 | 10/1983 | Michel ................................. 264/2.7 |
| 4,597,814 | 7/1986 | Colgate, Jr. ......................... 283/904 |

FOREIGN PATENT DOCUMENTS 1924536  11/1970  Fed. Rep. of Germany ...... 264/162

*Primary Examiner*—James Lowe

[57] ABSTRACT

The method includes the steps of inscribing or imprinting a symbol or message on a substantially flat surface of a block of plastic while the same is at an elevated temperature by the application of pressure to said surface. The plastic block is then cooled to approximately room temperature and all visible evidence of the inscription is "erased" by physically removing, as by grinding, the superficial layer of material which bears the visible inscription. The inscription is made to reappear on the surface of the remaining block of plastic by heating the same to approximately the elevated temperature at which the inscription was made until the symbol or message reappears.

6 Claims, No Drawings

METHOD OF ENCODING A SYMBOL OR MESSAGE ON A PLASTIC MATERIAL AND AN ARTICLE ON WHICH A SYMBOL HAS BEEN SO ENCODED

SUMMARY OF THE INVENTION

It is an object of this invention to encode a symbol or message on a block of plastic.

It is another object of this invention to make the encoded symbol or message reappear on the surface of a block of plastic after the symbol or message has been "erased".

The method is useful in espionage or as a novelty.

DETAILED DESCRIPTION

When a sheet, block or tablet of acrylic, or other thermoforming plastic, e.g. styrene, ABS, Kydex, PVC, ERETG, buterate or Uvex, is compressed under heat and allowed to cool, while this compressive force is continued to be applied to it until it is cooled, it will hold its new shape, but when it is reheated, it will return to its original configuration. Many different plastics exhibit this phenomenon, which may be refered to as "plastic memory".

An inscription, such as a letter, word, message, artwork or other symbol, may be imparted to the surface of a piece of acrylic, or other thermoforming plastic, by allowing a die to press against the surface of the piece of plastic softened and made compressible by heating (approximately to 300° F.) without burning into the material. Maintaining the pressure until the plastic returns to a temperature low enough to harden it holds or fixes the impression of the inscription. The necessary temperature varies with the type of thermoforming plastic used and the time required to heat it depends on the thickness of the plastic used.

If the visible inscription imparted to the surface of the plastic piece is removed down to the depth of the impression, as by grinding, routing, sanding or any other appropriate method of removal, while the plastic piece is kept at a cooler temperature than the temperature that made it soft and flexible, the inscription will reappear upon reheating to approximately the temperature at which the inscription was originally imparted. After the inscription has been made, by the application of heat and pressure, the plastic piece can be resurfaced by buffing, sanding, or texturing any way desired, obliterating any trace of tampering. I have discovered that a latent image of the inscription imparted remains in the plastic. Then, or at any future time, if this plastic piece is reheated to approximately the same temperature used when the inscription was imparted to it, such original impression will reappear "puffing up" in relief.

The thermoforming plastic used can be clear, translucent or opaque, and in any color or thickness manufactured.

If two opposite sides of a piece of thermoforming plastic are imparted, under heat, with a symbol or message, and only one side is refaced, and the symbol or message is made to disappear, by the grinding and polishing steps described above, simultaneously upon reheating, due to "plastic memory", the pressing with the visible impression which was not removed will disappear and the "hidden" impression will "puff up" and appear in relief.

In a similar way, only one side of a thermoforming plastic sheet, block, tablet, or the six sides, or a combination of the six sides, of a cube, or a sphere, or any polygonal shape can be pressed and made to bear symbols or messages that can be left visible or can be removed in order to make them disappear or reappear upon reheating.

PREFERRED EMBODIMENT

PLEXIGLAS is a cast poly(methyl methacrylate) sheet. A tablet of clear Plexiglas (cast acrylic sheet plastic) one quarter ($\frac{1}{4}''$) inch thick, and two inches by two ($2'' \times 2''$) inches, was placed on a pre-heated 325° F. oven for ten minutes which made the Plexiglas piece change from a rigid state to a soft and flexible state. The Plexiglas piece was then removed from the oven and placed between two metal dies in a press, one die bearing the inscription, "Be My Valentine", and the other die bearing the inscription, "I Love You", and both inscriptions on the dies were in relief letters. Pressure was then applied until the raised letters in the metal dies pushed into the Plexiglas tablet to make an impression on each side of the Plexiglas tablet. The Plexiglas tablet was then allowed to cool until it became rigid again, at which point, the Plexiglas tablet was removed from the press and separated from the two metal dies. This procedure resulted in pressed-in messages being imparted to each of the two sides of the Plexiglas tablet.

The side of the Plexiglas tablet with the impression bearing the message, "I Love You", was then resurfaced down to the depth of the letters and polished to obliterate any trace of that impression. Because this particular Plexiglas piece was clear Plexiglas it permitted the message, "Be My Valentine", to be seen from either side of the tablet, and showed no trace of the second message, "I Love You", which had been removed by resurfacing down to the depth of those letters.

The Plexiglas tablet was then placed back in the oven at 325° F. for ten minutes, after which time simultaneously the visible message, "Be My Valentine", disappeared and the "hidden" message, "I Love You", reappeared "puffing up" in relief, and this message could be seen from either side of the Plexiglas tablet.

What I claim is:

1. A method of making reappear a symbol by message that has been encoded on a block of plastic or enscribing under pressure the symbol or message on a surface of the block while said block is at an elevated temperature, cooling said block to approximately room temmperature and physically removing the inscription while the block is at approximately room temperature, said method of making the symbol or message reappear comprising the steps of heating the block so previously treated to approximately the temperature at which the symbol or message was enscribed, said heating continuing until the symbol or message reappears.

2. The method of claim 1 wherein the plastic is acrylic.

3. The method of claim 1 wherein the plastic is poly(methyl methacrylate)

4. An article comprising a tablet of plastic material with a latent image, which image was impressed by the simultaneous application of heat and pressure and which image has been physically removed at room temperature temporarily, such that when the block is reheated to the temperature used during the impressing of the image, the image will reappear.

5. The article of claim 4 wherein the plastic material is acrylic.

6. The article of claim 4 wherein the plastic material is poly(methyl methacrylate).

* * * * *